(12) United States Patent
Song et al.

(10) Patent No.: US 11,965,491 B2
(45) Date of Patent: Apr. 23, 2024

(54) SOFT ACTUATORS WITH TWISTED COILED POLYMER ACTUATORS

(71) Applicant: Toyota Motor Engineering & Manufacturing North America, Inc., Plano, TX (US)

(72) Inventors: Yuyang Song, Ann Arbor, MI (US); Shinnosuke Shimokawa, Ann Arbor, MI (US); Danil V. Prokhorov, Canton, MI (US); Umesh N. Gandhi, Farmington Hills, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/941,079

(22) Filed: Sep. 9, 2022

(65) Prior Publication Data
US 2024/0084788 A1    Mar. 14, 2024

(51) Int. Cl.
*F03G 7/06* (2006.01)
*B25J 9/10* (2006.01)
(Continued)

(52) U.S. Cl.
CPC .......... *F03G 7/0612* (2021.08); *B25J 9/1075* (2013.01); *B25J 9/142* (2013.01); *B25J 18/02* (2013.01);
(Continued)

(58) Field of Classification Search
CPC ........ F03G 7/06; F03G 7/0612; F15B 15/103; B25J 9/142; B25J 9/1075; B25J 9/104; B25J 9/1045; B25J 18/02; B25J 18/06
See application file for complete search history.

(56) References Cited

U.S. PATENT DOCUMENTS

| | | | |
|---|---|---|---|
| 5,317,952 A * | 6/1994 | Immega | F15B 15/10 901/22 |
| 10,233,910 B2 | 3/2019 | Mazzeo et al. | |

(Continued)

FOREIGN PATENT DOCUMENTS

WO    2022036408 A1    2/2022

OTHER PUBLICATIONS

Onal, C.D. & Wood, Robert & Rus, Daniela. (2013). An Origami-Inspired Approach to Worm Robots. Mechatronics, IEEE/ASME Transactions on. 18. 430-438. 10.1109/TMECH.2012.2210239. (Year: 2013).*

(Continued)

*Primary Examiner* — Mark A Laurenzi
*Assistant Examiner* — Xiaoting Hu
(74) *Attorney, Agent, or Firm* — Christopher G. Darrow; Darrow Mustafa PC

(57) ABSTRACT

A soft actuator includes an origami structure with an inflatable hollow body formed from at least one of Dyneema fabric or Kevlar fabric, and a plurality of TCPAs formed from at least one of polyethylene terephthalate, spandex, and nylon. The soft actuator also includes a plurality of heating wires disposed on the plurality of TCPAs and a controller configured to selectively heat the plurality of heating wires such that the plurality of TCPAs are selectively actuated by being heated by the plurality of heating wires.

20 Claims, 7 Drawing Sheets

(51) Int. Cl.
  *B25J 9/14* (2006.01)
  *B25J 18/02* (2006.01)
  *B25J 18/06* (2006.01)

(52) U.S. Cl.
  CPC .......... *B25J 18/06* (2013.01); *F03G 7/06143* (2021.08); *F03G 7/0616* (2021.08); *F03G 7/062* (2021.08)

(56) References Cited

U.S. PATENT DOCUMENTS

| | | | |
|---|---|---|---|
| 10,465,723 | B2 | 11/2019 | Ilievski et al. |
| 11,143,169 | B2 | 10/2021 | Li et al. |
| 2015/0070904 | A1* | 3/2015 | Martinez ............... F15B 15/103 92/261 |
| 2015/0152852 | A1* | 6/2015 | Li ........................... D04C 1/02 60/527 |
| 2018/0363683 | A1 | 12/2018 | Shepherd et al. |

OTHER PUBLICATIONS

Zhang, Ketao & Qiu, Chen & Dai, Jian. (2015). An Extensible Continuum Robot With Integrated Origami Parallel Modules. Journal of Mechanisms and Robotics. 8. 10.1115/1.4031808. (Year: 2015).*

Santoso, Junius & Skorina, Erik & Luo, Ming & Yan, Ruibo & Onal, C.D.. (2017). Design and analysis of an origami continuum manipulation module with torsional strength. 2098-2104. 10.1109/IROS.2017.8206027. (Year: 2017).*

Jeong, Donghwa & Lee, Kiju. (2017). Design and Analysis of an Origami-Based Three-Finger Manipulator. Robotica. 36. 10.1017/S0263574717000340. (Year: 2017).*

Santoso, Junius & Onal, C.D.. (2020). An Origami Continuum Robot Capable of Precise Motion Through Torsionally Stiff Body and Smooth Inverse Kinematics. Soft Robotics. 8. 10.1089/soro.2020.0026. (Year: 2020).*

Hu, Fuwen & Wang, Wei & Cheng, Jingli & Bao, Yunchang. (2020). Origami spring-inspired metamaterials and robots: An attempt at fully programmable robotics. Science Progress. 103. 1-19. 10.1177/0036850420946162. (Year: 2020).*

Lee, Kiju & Wang, Yanzhou & Zheng, Chuanqi. (2020). Twister Hand: Underactuated Robotic Gripper Inspired by Origami Twisted Tower. IEEE Transactions on Robotics. pp. 1-13. 10.1109/TRO.2019.2956870. (Year: 2020).*

Zhang, Zhuang & Tang, Sj & Fan, Weicheng & Xun, Yuanhao & Wang, Hao & Chen, Genliang. (Mar. 2022). Design and analysis of hybrid-driven origami continuum robots with extensible and stiffness-tunable sections. Mechanism and Machine Theory. 169. 104607. 10.1016/j.mechmachtheory.2021.104607. (Year: 2022).*

Jiang, Hanqing. (Jan. 2022). Journal Club for Jan. 2022: Cylindrical Origami: From Foldable Structures to Versatile Robots. iMechanica. (Year: 2022).*

Tung et al., "A MEMS-based flexible sensor and actuator system for space inflatable structures," Smart Materials and Structures, vol. 10, No. 6, Nov. 26, 2001, pp. 1230-1239.

Palacio et al., "A novel Inflatable Actuator for Inflatable Robotic Arms," 2017 IEEE International Conference on Advanced Intelligent Mechatronics (AIM), Sheraton Arabella Park Hotel, Munich, DE, Jul. 3-7, 2017, pp. 88-93.

Ohta et al., "Design of a Lightweight Soft Robotic Arm Using Pneumatic Artificial Muscles and Inflatable Sleeves," Soft Robotics, vol. 5, No. 2, Apr. 1, 2018, pp. 204-215.

* cited by examiner

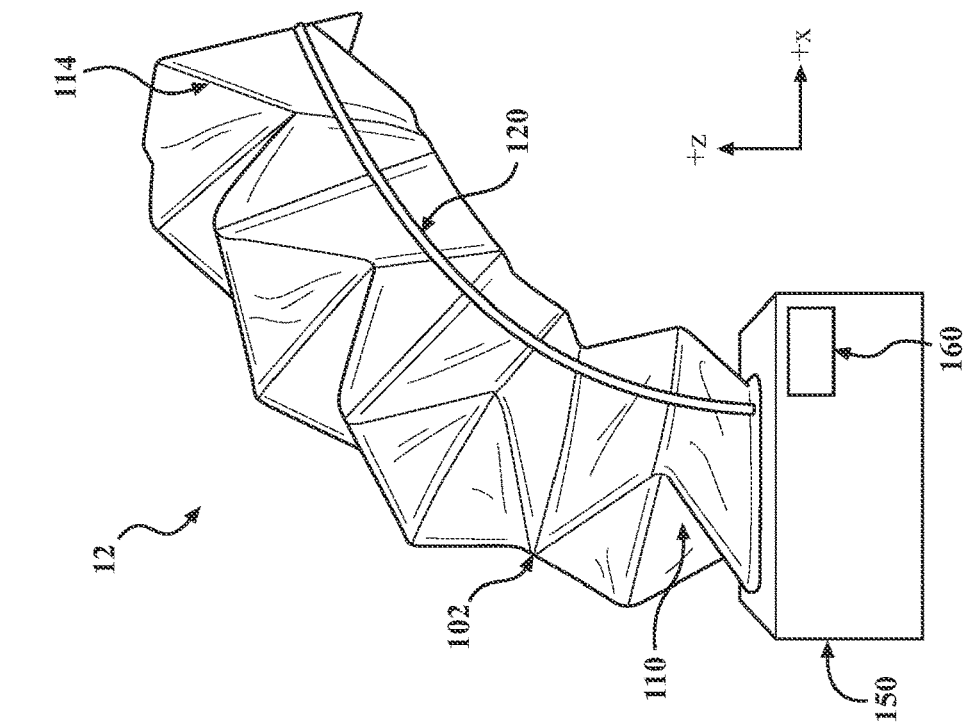
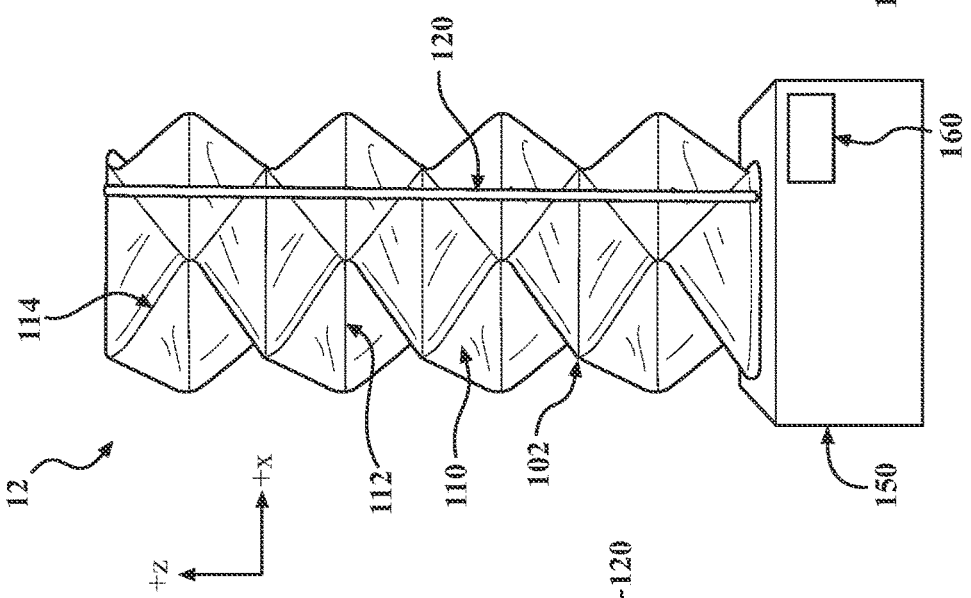
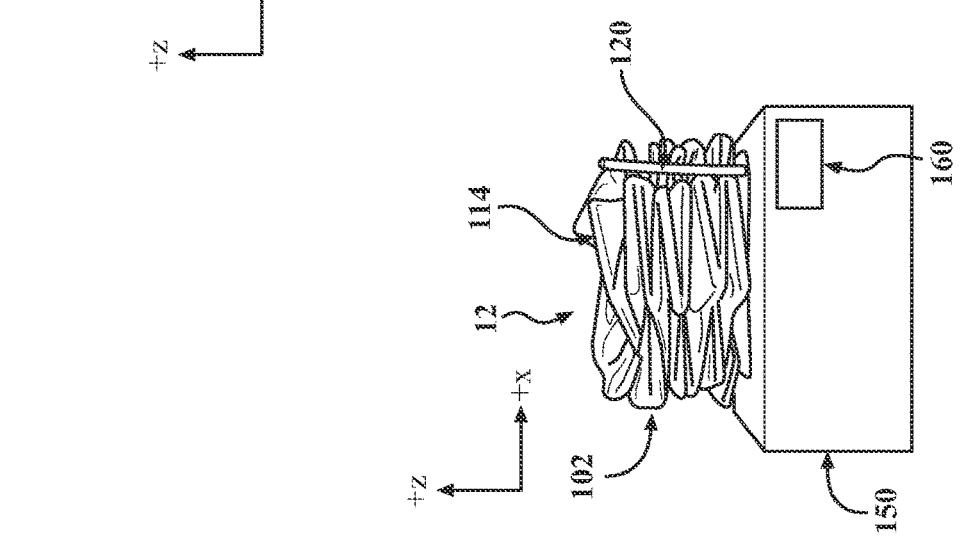

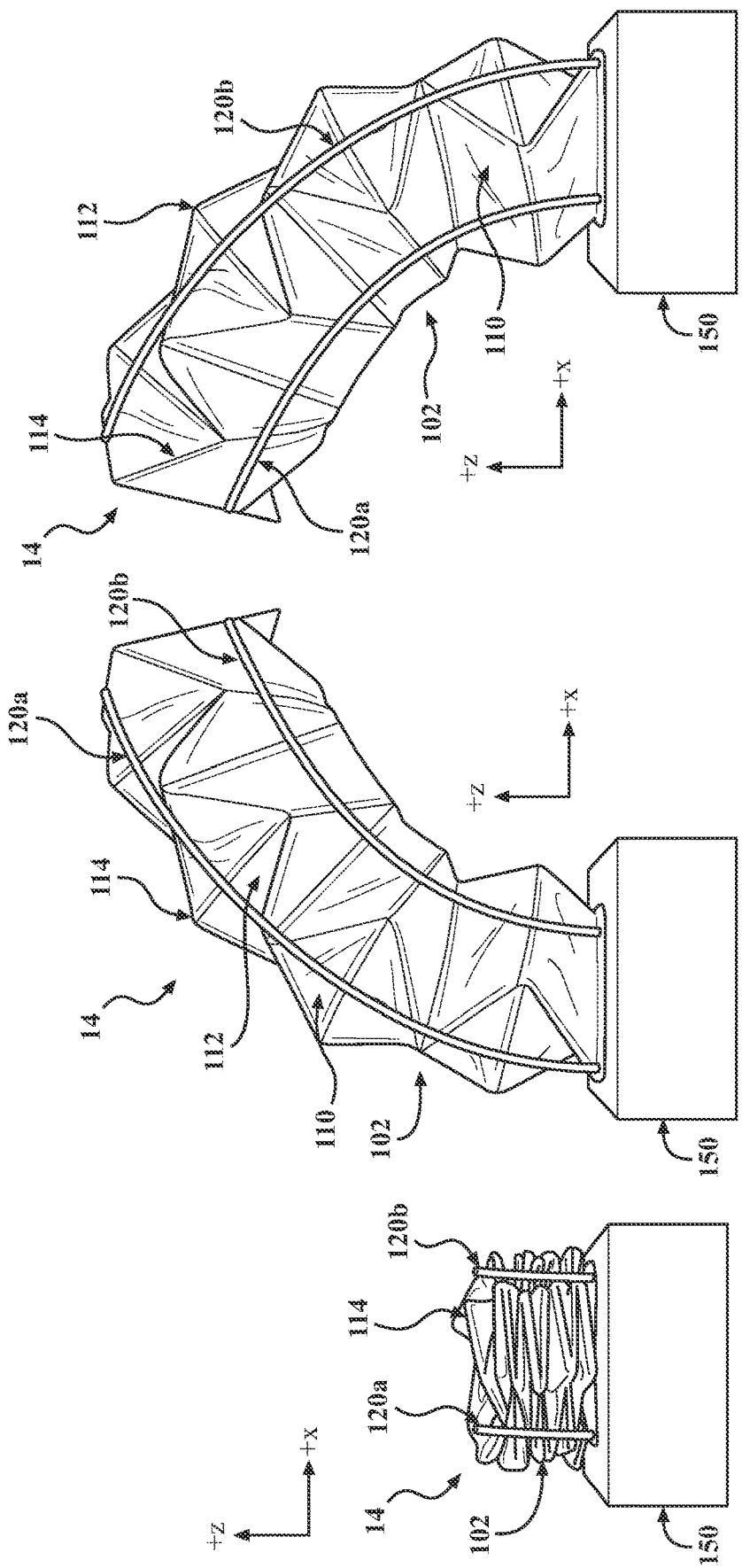

SOFT ACTUATORS WITH TWISTED COILED POLYMER ACTUATORS

TECHNICAL FIELD

The present disclosure relates generally to soft actuators, and particularly to deployable soft actuators.

BACKGROUND

Actuators are ubiquitous building blocks of modern society, spanning industries such as automotive, aeronautic, and robotics. And unlike traditional actuators typically made from heavy and/or rigid materials that limit power density of an actuator, soft actuators are made of pliable, flexible materials and can enhance power density. However, soft actuators can have limited degrees of freedom with respect to movement and/or deployment.

The present disclosure addresses issues related to the movement and/or deployment of soft actuators along with other issues related to soft actuators.

SUMMARY

This section provides a general summary of the disclosure and is not a comprehensive disclosure of its full scope or all of its features.

In one form of the present disclosure, a soft actuator includes an origami structure comprising a woven fabric forming a hollow body and inflation of the hollow body creates an inflated origami structure.

In another form of the present disclosure, a soft actuator includes an origami structure and a twisted coiled polymer actuator (TCPA) disposed on at least one corner of the origami structure. The origami structure includes a hollow body formed from a woven fabric selected from Dyneema fabric or Kevlar fabric, inflation of the hollow body creates an inflated origami structure, and actuation of the TCPA via a change in temperature manipulates inflation of the origami structure.

In still another form of the present disclosure, a soft actuator includes an origami structure with an inflatable hollow body formed from at least one of Dyneema fabric or Kevlar fabric and a plurality of TCPAs formed from at least one of polyethylene terephthalate, spandex, and nylon. The soft actuator also includes a plurality of heating wires disposed on the plurality of TCPAs and a controller configured to selectively heat the plurality of heating wires such that the plurality of TCPAs are selectively actuated by being heated by the plurality of heating wires.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 2A shows a side view of an inflatable origami structure in an uninflated state according to another form of the present disclosure;

FIG. 2B shows a side view of the inflatable origami structure in FIG. 2A in a first inflated state according to the teachings of the present disclosure;

FIG. 2C shows a side view of the inflatable origami structure in FIG. 2A in a second inflated state according to the teachings of the present disclosure;

FIG. 4A shows a side view of an inflatable origami structure in an uninflated state according to yet another form of the present disclosure;

FIG. 4B shows a side view of the inflatable origami structure in FIG. 3A in a first inflated state according to the teachings of the present disclosure;

FIG. 4C shows a side view of the inflatable origami structure in FIG. 3A in a second inflated state according to the teachings of the present disclosure;

DETAILED DESCRIPTION

The present disclosure provides a soft actuator in the form of an inflatable origami structure. The inflatable origami structure is formed by folding or creasing a sheet into set shapes, i.e., an origami pattern. An origami pattern is formed by cutting and folding a flat sheet to allow a compact shape to be assembled into an open structure with a rich geometry. The term "origami" is also intended to include origami variations, such as modular origami, where multiple folded flat sheets are coupled together, and kirigami, where the folded flat sheet has additional cutting steps after folding step(s), among other. Examples of common origami shapes include, but are not limited to, tiled shapes such as triangles, squares, or hexagons, and three-dimensional structures or shapes such as open polyhedrons, cylinders, honeycombs, and nested cylinders, among others with complex combinations of flat or curved surfaces. The creases or folds of the origami pattern may have no reinforcement, or in the alternative, one or more of the creases or folds can be reinforced by the addition of flexible wires or glues. In some variations of the present disclosure, an inflatable origami structure includes one or more actuatable fibers or cords that control or modify the deployment, the predefined shape, and/or the holding force of the soft actuator in the inflated state.

Figure 1A:
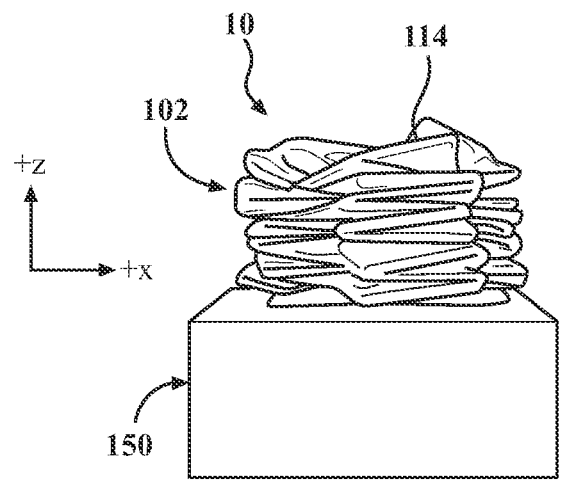
FIG. 1A shows a side view of an inflatable origami structure in an uninflated state according to one form of the present disclosure.
Figure 1B:
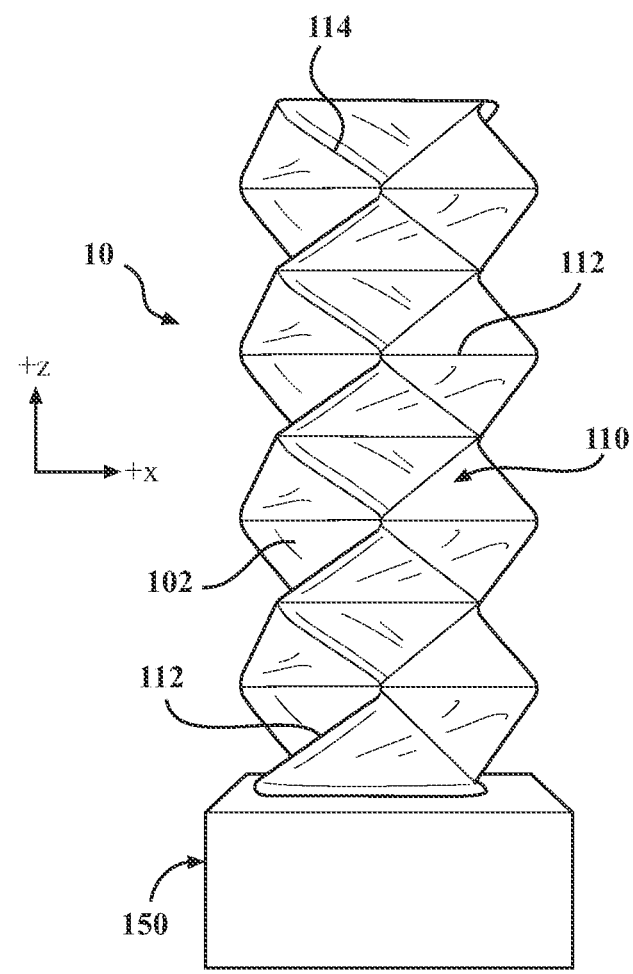
FIG. 1B shows a side view of the inflatable origami structure in FIG. 1A in an inflated state according to the teachings of the present disclosure.

Referring to FIGS. 1A-1B, a soft actuator 10 according to one form of the present disclosure is shown. The soft actuator 10 in an uninflated state is shown in FIG. 1A and the soft actuator 10 in an inflated state is shown in FIG. 1B. The soft actuator 10 includes an inflatable hollow origami body 110 (also referred to herein simply as "inflatable origami body") that can be internally pressurized with a fluid (e.g., air or water) such that the soft actuator 10 moves or expands between the uninflated state (FIG. 1A) and the inflated state (FIG. 1B). In addition, the inflatable origami body 110 can be depressurized such that the soft actuator 10 moves or contracts between the inflated state (FIG. 1B) and the uninflated state (FIG. 1A). And while the inflated state shown in FIG. 1B illustrates the soft actuator 10 extending in a single direction (e.g., the z direction shown in FIG. 1B), it should be understood that the soft actuator 10 can extend in more than one direction, e.g., in the z-x directions, z-y directions, or z-x-y directions. Stated differently, the soft actuator 10 can have a bent shape, a curved shape, or have a more complex structure extending in more than one direction in the inflated state as discussed in greater detail below.

The inflatable origami body 110 includes or is formed from a sheet 102 with a plurality of folds or creases 112. In some variations, the sheet 102 is a fabric, e.g., a woven fabric. Nonlimiting examples of the woven fabric include woven fabrics formed from nylon, polyester, Kevlar, Dyneema, or a combination thereof. In some variations, the sheet 102 is fluid impermeable due to the inherent characteristics of the sheet 102. In other variations, the sheet 102 is initially fluid permeable and includes additional lamination and/or impregnation of woven or non-woven material such that the sheet 102 is fluid impermeable. And in some variations, the sheet 102 may be structurally reinforced to increase the holding force of the structure.

In at least one variation, one or more of the folds 112 have no reinforcement, i.e., only the sheet 102 is present at the folds 112, while in some variations, one or more of the folds 112 include a reinforcement 114. Non-limiting examples of the reinforcement 114 include an adhesive applied and attached the fold(s) 112 and/or a structural member (e.g., a wire, tube, strip, beam, among others) attached to the fold(s) 112. And in some variations, the soft actuator 10 includes a base 150 that provides a support structure for the inflatable origami body 110. However, in other variations the soft actuator 10 does not include a base, i.e., the inflatable origami body 110 is self-supporting.

Referring now to FIGS. 2A-2C, a soft actuator 12 according to another form of the present disclosure is shown. The soft actuator 12 includes the inflatable origami body 110 formed from the sheet 102 with the plurality of folds or creases 112. However, and unlike the soft actuator 10, the soft actuator 12 includes a TCPA 120 extending along a length (z direction) of the inflatable origami body 110. The TCPA 120 is configured to reversibly contract (i.e., decrease in length) and expand (i.e., increase in length). In some variations, the TCPA 120 is actuated by heating the TCPA 120, while in other variations the TCPA is actuated by cooling the TCPA. In at least one variation, the TCPA decreases in length when actuated, while in other variations the TCPA 120 increases in length when actuated.

Referring particularly to FIG. 2A, the soft actuator 12 is in an uninflated state. And in the uninflated state, the TCPA 120 can be in an actuated state, an unactuated state, or a partially actuated state. Referring to FIG. 2B-2C, the inflatable origami body 110 is pressurized and the soft actuator 12 is in a first inflated state in FIG. 2B and in a second inflated state in FIG. 2C. As observed from FIGS. 2B-2C, the soft actuator 12 extends generally in a single direction (z-direction) in the first inflated state and extends generally in two directions (x and z directions) in the second inflated state. Stated differently, the soft actuator 12 in the first inflated state has a straight or unbent shape and in the second inflated shape the soft actuator 12 has a bent shape.

The soft actuator 12 is configured to move from or between the uninflated state (FIG. 2A) and the first inflated state (FIG. 2B), from or between the uninflated state (FIG. 2A) and the second inflated state (FIG. 2C), from or between the first inflated state (FIG. 2B) and the second inflated state (FIG. 2C), and from or between the second inflated state (FIG. 2C) and the first inflated state (FIG. 2B). Particularly, via pressurization of the inflatable origami body 110 and optional actuation of the TCPA 120, control of the inflation (including directional control) of the inflatable origami body 110 occurs. In some variations, simply inflating the inflatable origami body 110 without actuation of the TCPA 120 results in the soft actuator 12 moving from or between the uninflated state (FIG. 2A) and the first inflated state (FIG. 2B). In other variations, inflating the inflatable origami body 110 and actuating, and contracting, the TCPA 120 results in the soft actuator 12 moving from or between the uninflated state (FIG. 2A) and the second inflated state (FIG. 2C). That is, actuating the TCPA 120 forces, pulls, and/or bends the inflatable origami body 110 towards a given and/or desired direction and de-actuating the TCPA 120 provides for the inflatable origami body 110 to move and/or unbend towards a given and/or desired direction. In this manner the soft actuator 12 can have a plurality of inflated states via actuation and/or de-actuation of the TCPA 120.

In addition, while the soft actuator 12 is shown in FIG. 2B in the first inflated state without actuation of the TCPA 120 and in FIG. 2C with actuation of the TCPA 120, it should be understood that inflation/deflation and actuation/de-actuation may be affected simultaneously or in any order necessary to affect a desired movement, e.g., actuation along with inflation, inflation followed by actuation, actuation followed by inflation, and the like.

In some variations, and as shown in FIGS. 2B and 2C, the TCPA 120 extends along the entire length (z direction) of the soft actuator 12, However, in other variations the TCPA 120 extends along only a portion of the length of the soft actuator 12 and yet affects or causes a desired movement (e.g., the movement illustrated in FIGS. 2B-2C). And similar to the soft actuator 10, in some variations, the soft actuator 12 includes a base 150 that provides a support structure for the inflatable origami body 110. However, in other variations the soft actuator 12 does not include a base, i.e., the inflatable origami body 110 is self-supporting.

Figure 3A:
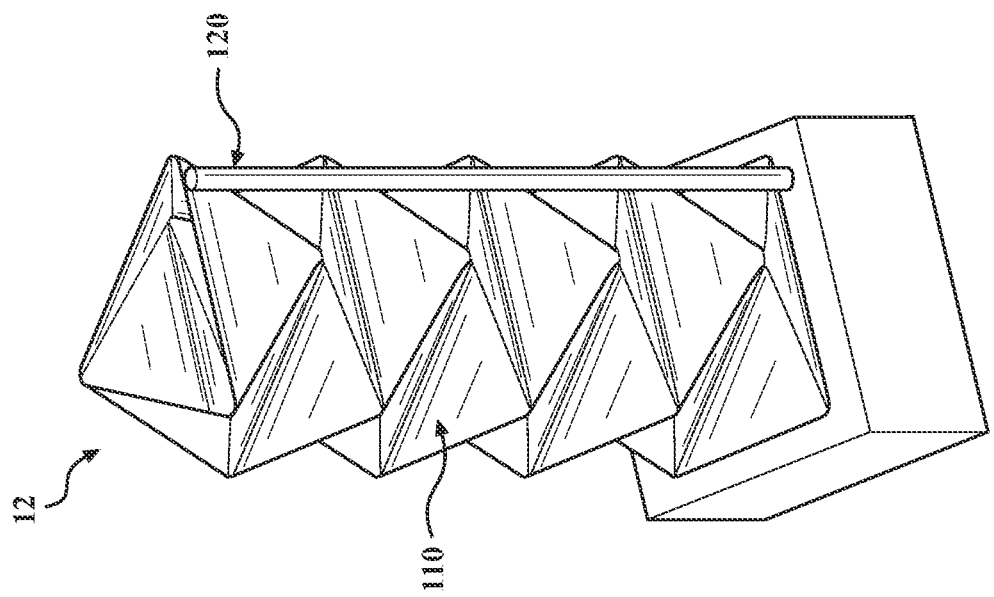
FIG. 3A shows a top perspective view of the inflatable origami structure in FIG. 2A with a twisted coiled polymer actuator TCPA disposed outside a hollow body of the inflatable origami structure according to one form of the present disclosure.
Figure 3B:
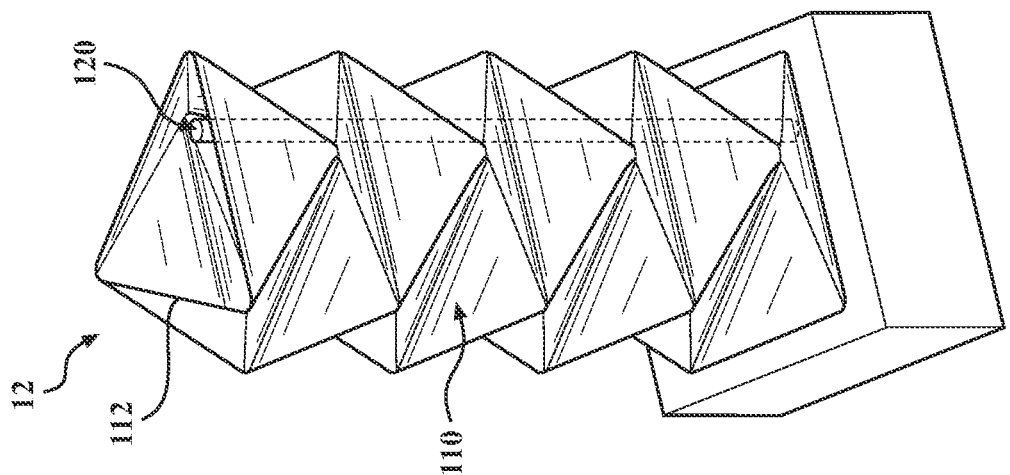
FIG. 3B shows a top perspective view of an inflatable origami structure in FIG. 2B with a TCPA within the hollow body of the inflatable origami structure according to another form of the present disclosure.

In some variations, the TCPA 120 is attached to the inflatable origami body 110 along the length (z direction) of the inflatable origami body 110, while in other variations the TCPA 120 is attached to opposite spaced apart ends (z direction) of the inflatable origami body 110. And in at least one variation one end of the TCPA 120 is attached to the base 150 and an opposite end of the TCPA 120 is attached to a distal end (+z direction) of the inflatable origami body 110. In addition, and as illustrated in FIG. 3A-3B, in some variations the TCPA 120 is disposed outside of the inflatable origami body 110 (FIG. 3A), while in other variations the TCPA 120 is disposed inside of the inflatable origami body 110 (FIG. 3B), i.e., within an interior 114 of the inflatable origami body 110. In some variations, the TCPA 120 is attached physically or chemically to the sheet 102. And in such variations, the TCPA 120 can be attached to the sheet 102 at a single discrete attachment point along the length of the TCPA 120, multiple attachment points along the length of the TCPA 120, or a continuous attachment along the length of the TCPA 120. In addition, in at least one variation the TCPA 120 is on or disposed on one or more folds 112, between one or more folds 112, and/or at one or more corners between multiple folds, i.e., at a vertex, of the inflatable origami body 110.

The TCPA 120 is a polymer that is twisted in order to form a coiled structure with an inter-coil spacing. The TCPA 120 is composed of any suitable actuating material that contracts or expands upon receiving an actuating stimulus. In some variations, the TCPA 120 has a positive or negative radial thermal expansion coefficient, which results in twisting or untwisting upon heating and thereby decreasing or increasing the inter-coil spacing. Nonlimiting examples of TCPA 120 include nylon, spandex, polyester, polyethylene, polyethylene terephthalate, or combinations thereof.

In some variations, the soft actuator 12 includes a TCPA actuator 160 configured to provide an actuating stimulus to the TCPA 120. The TCPA actuator 160 provides any suitable actuating stimulus to the TCPA 120 such that the TCPA 120 contracts or expands upon actuation. In some variations, the TCPA actuator 160 provides an electrical stimulus to the TCPA 120 and/or a thermal stimulus to the TCPA 120. For example, in at least one variation the actuating stimulus is Joule heating of a conductive wire extending along at least a portion of the length of TCPA 120 such that at least a portion of the length of the TCPA 120 is heated, thereby changing the inter-coil spacing of the TCPA. Alternatively, the TCPA 120 is coated with a conductive coating such as silver, copper, or the like such that at least a portion of the length of the TCPA 120 increases in temperature via Joule heating to a coiling/uncoiling temperature.

Referring now to FIGS. 4A-4C, a soft actuator 14 according to another form of the present disclosure is shown. The soft actuator 14 includes the inflatable origami body 110 formed from the sheet 102 with the plurality of folds or creases 112. However, and unlike the soft actuators 10 and 12, the soft actuator 14 includes at least two spaced apart TCPAs 120 (shown as 120a and 120b in FIGS. 4A-4C) extending along a length (z direction) of the inflatable origami body 110. The TCPAs 120a, 120b are each configured to reversibly contract (i.e., decrease in length) and expand (i.e., increase in length). In some variations, each of the TCPAs 120a, 120b are actuated by heating thereof, thereby changing the inter-coil spacing, while in other variations the TCPAs 120a, 120b are actuated by cooling thereof, thereby changing the inter-coil spacing. In at least one variation, the TCPAs 120a, 120b decrease in length when actuated, while in other variations the TCPAs 120a, 120b increase in length when actuated.

Referring particularly to FIG. 4A, the soft actuator 14 is in an uninflated state. And in the uninflated state, the TCPA 120a and/or the TCPA 120b can be in an actuated state, an unactuated state, or a partially actuated state. Referring to FIG. 4B, the inflatable origami body 110 is pressurized and the soft actuator 14 is in a first inflated state, and referring to FIG. 4C the inflatable origami body 110 is pressurized and the soft actuator 14 is in a second inflated state. As observed from FIG. 4B, the TCPA 120b is actuated and the TCPA 120a is not actuated such that the TCPA 120b is shorter in length than the TCPA 120a and the soft actuator 14 is bent in the +x direction. And as observed from FIG. 4C, the TCPA 120a is actuated and the TCPA 120b is not actuated such that the TCPA 120a is shorter in length than the TCPA 120b and the soft actuator 14 is bent in the −x direction. Accordingly, the soft actuator 14 moves from the uninflated state (FIG. 4A) to the second inflated state (FIG. 4C) and/or from the first inflated state (FIG. 4B) to the second inflated state (FIG. 4C) via pressurization of the inflatable origami body 110 and actuation and contraction of the TCPA 120a and/or TCPA 120b. That is, reducing the length of the TCPA 120b (FIG. 2B) forces the respective side or section of the inflatable origami body 110 to have a shorter length than an opposing side of the inflatable origami body 110 such that the inflatable origami body 110 bends towards the +x direction. Also, reducing the length of the TCPA 120a (FIG. 2C) forces the respective side or section of the inflatable origami body 110 to have a shorter length than an opposing side of the inflatable origami body 110 such that the inflatable origami body 110 bends towards the −x direction. In this manner, the soft actuator 14 can have a plurality of inflated states via actuation and/or de-actuation of the TCPA 120a and/or the TCPA 120b.

It should be understood that the TCPA 120a can be de-actuated and the TCPA 120b can be actuated such that the soft actuator 14 moves from the second inflated state (FIG. 4C) to the first inflated state (FIG. 4B). In addition, the inflatable origami body 110 can be depressurized such that the soft actuator 14 moves from the first inflated state (FIG. 4B) and/or the second inflated state (FIG. 4C) to the uninflated state (FIG. 4A). And it should be understood that inflation and actuation may be affected simultaneously or in any order necessary to affect the desired movement, i.e., actuation along with inflation, inflation followed by actuation, or actuation followed by inflation.

In some variations, and as shown in FIGS. 4B and 4C, the TCPAs 120a, 120b extend along the entire length (z direction) of the soft actuator 14, while in other variations the TCPA 120a and/or the TCPA 120b extend along only a portion of the length of the soft actuator 14 and yet effects or causes a desired (e.g., the movement illustrated in FIGS. 4B-4C). And similar to the soft actuators 10 and 12, in some variations the soft actuator 14 includes a base 150 that provides a support structure for the in inflatable origami body 110. However, in other variations the soft actuator 14 does not include a base, i.e., the inflatable origami body 110 is self-supporting.

In some variations, the soft actuator 14 includes a TCPA actuator 170 configured to provide an actuating stimulus to the TCPAs 120a, 120b. The TCPA actuator 170 provides any suitable actuating stimulus to the TCPAs 120a, 120b such that the TCPAs 120a, 120b contract or expand upon actuation. In some variations, the TCPA actuator 170 provides an electrical stimulus to the TCPAs 120a, 120b and/or a thermal stimulus to the TCPAs 120a, 120b. For example, in at least one variation the actuating stimulus is Joule heating of a conductive wire extending along at least a portion of the length of the TCPAs 120a, 120b such that at least a portion of the length of the TCPAs 120a, 120b is heated, thereby changing the inter-coil spacing of the TCPAs 120a, 120b. Alternatively, the TCPAs 120a, 120b are coated with a conductive coating such as silver, copper, or the like such that at least a portion of the length of the TCPAs 120a, 120b increases in temperature via Joule heating to a coiling/uncoiling temperature.

Figure 5A:
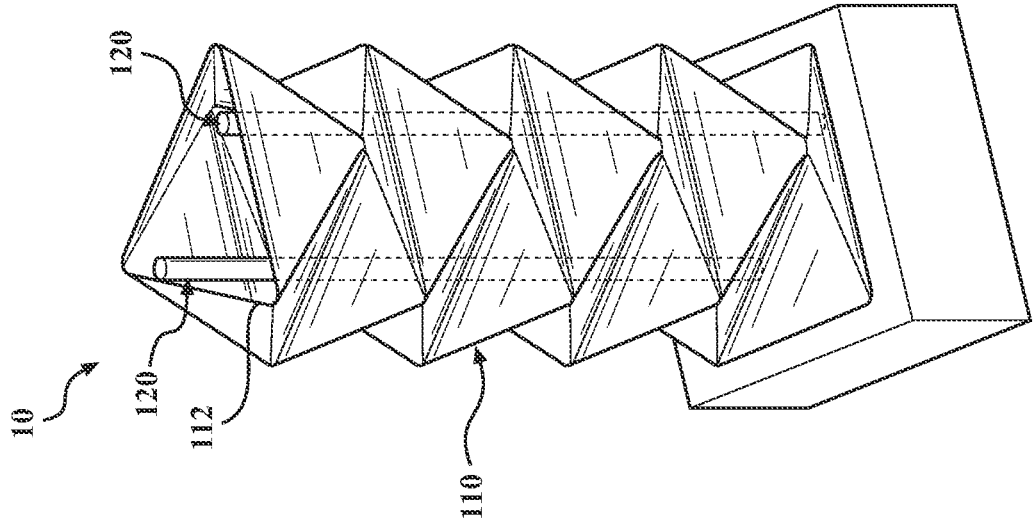
FIG. 5A shows a top perspective view of the inflatable origami structure in FIG. 4A with a plurality of twisted coiled polymer actuators TCPAs outside a hollow body of the inflatable origami structure according to one form of the present disclosure.
Figure 5B:
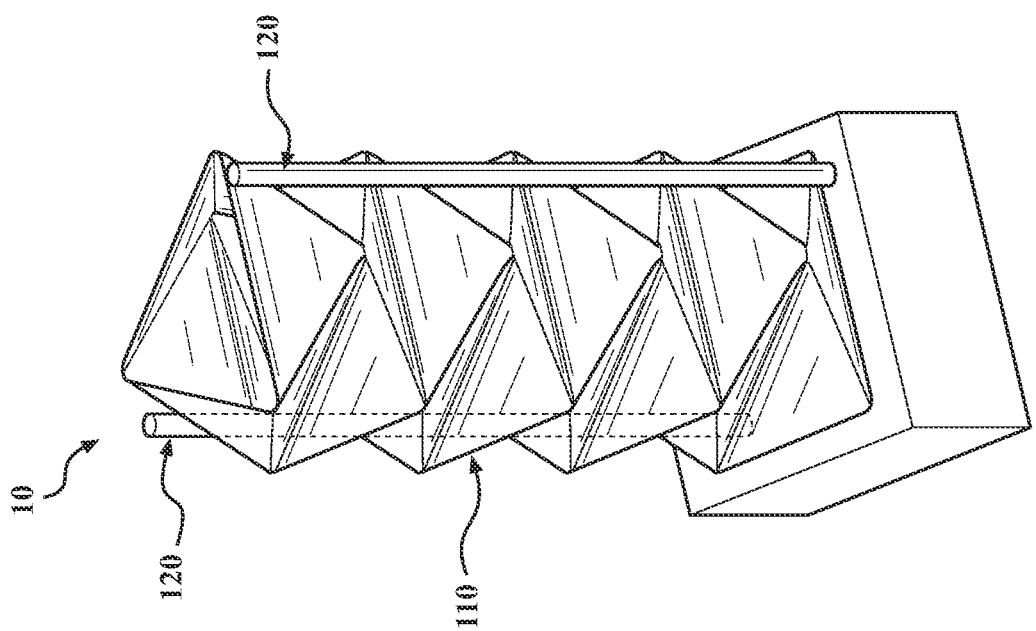
FIG. 5B shows a top perspective view of the inflatable origami structure in FIG. 4A with a plurality of TCPAs within a hollow body of the inflatable origami structure according to another form of the present disclosure.

In some variations, the TCPA 120a and/or the TCPA 120b are/is attached to the inflatable origami body 110 along the length (z direction) of the inflatable origami body 110, while in other variations the TCPA 120a and/or the TCPA 120b are/is attached to opposite spaced apart ends (z direction) of the inflatable origami body 110. And in at least one variation one end of the TCPA 120a and/or the TCPA 120b is attached to the base 150 and an opposite end of the TCPA 120a and/or TCPA 120b, respectively, is attached to a distal end (+z direction) of the inflatable origami body 110. In addition, and as illustrated in FIG. 5A-5B, in some variations the TCPAs 120a, 120b are disposed outside of the inflatable origami body 110 (FIG. 5A) while in other variations the TCPAs 120a, 120b are disposed inside of the inflatable origami body 110 (FIG. 4B), i.e., within an interior 114 of the inflatable origami body 110.

In some variations, the TCPAs 120a and/or TCPA 120b are/is attached physically or chemically to the sheet 102 and the TCPA 120a and/or TCPA 120b can be attached to the sheet 102 at a single discrete attachment point along the length of the TCPA 120a and/or TCPA 120b, multiple attachment points along the length of the TCPA 120a and/or TCPA 120b, or a continuous attachment along the length of the TCPA 120a and/or TCPA 120b. In addition, in some variations the TCPA 120a and/or TCPA 120b are/is on one or more folds 112, between one or more folds 112, and/or at one or more corners between multiple folds, i.e., at a vertex, of inflatable origami body 110.

Figure 6:
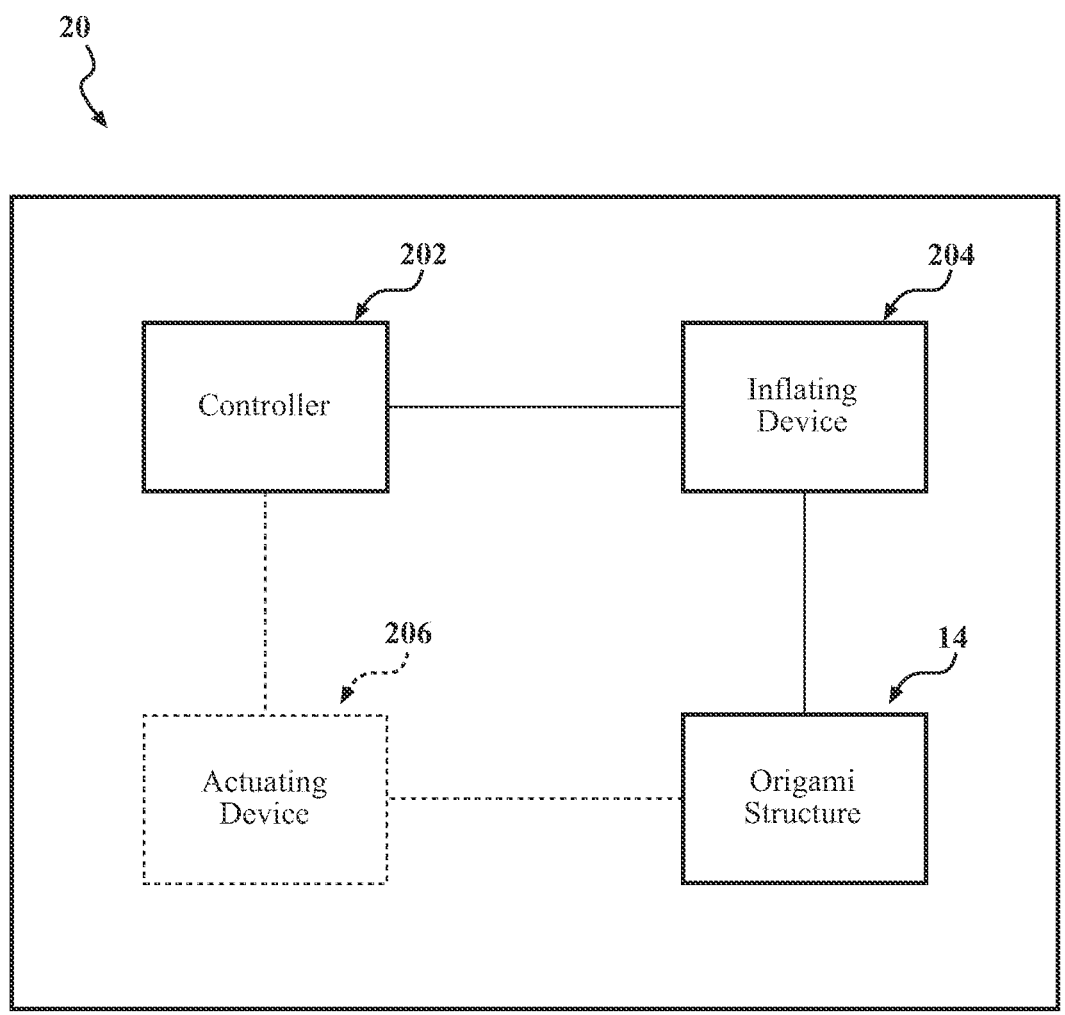
FIG. 6 shows a block diagram for soft actuator system according to one form of the present disclosure.

Referring to FIG. 6, a block diagram for a soft actuator system 20 is shown. The soft actuator system 20 includes the soft actuator 10, 12 and/or 14 (soft actuator 14 shown in FIG. 6 for example purposes only), a controller 202, an inflating device 204 (e.g., an air pump), and an optional TPCA actuating device 206. The inflating device 204 is configured to pressurize and inflate the inflatable origami body 110, the TCPA actuating device 206 is configured to actuate one or more TCPAs 120, if present, and the controller 202 is configured to command the inflating device 204 to pressurize or depressurize the inflatable origami body 110, and to command the TCPA actuating device 206 to actuate and de-actuate the one or more TCPAs 120 if present. The controller 202 is also configured to receive instructions, e.g., from a user and/or a processor, among others, that are executed such that the soft actuator 14 is inflated into one or more inflated states and deflated from one or more inflated states.

Figure 7:
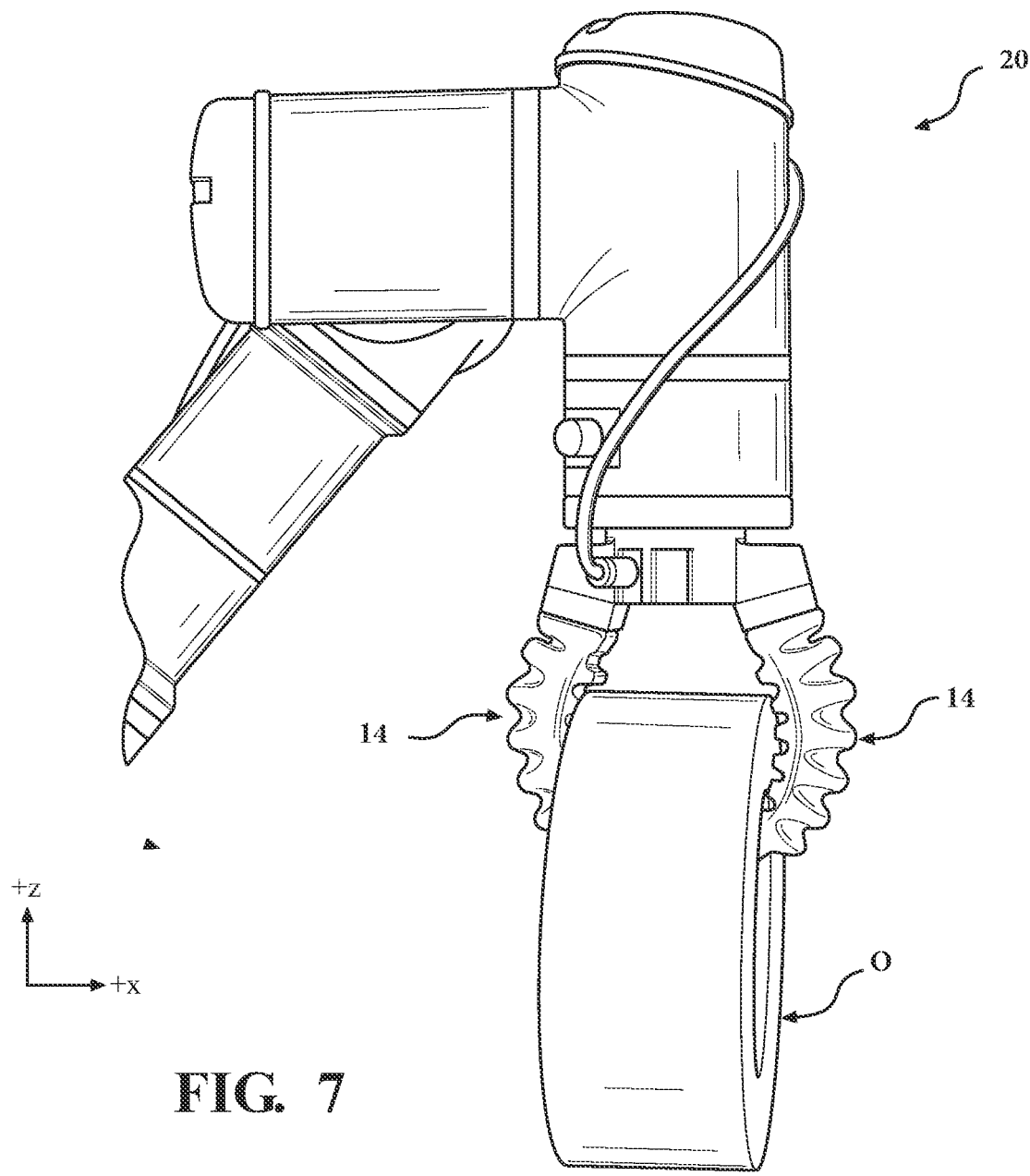
FIG. 7 shows one example of a soft actuator according to the teachings of the present disclosure.

Referring now to FIG. 7, one non-limiting example of the soft actuator system 20 is shown. The soft actuator system 20 includes the controller 202, the inflating device 204, the TCPA actuating device 206 (all shown in FIG. 6), and a pair (two) of soft actuators 14. The controller 202 is configured to command the inflating device 204 and the TCPA actuating device 206 to execute one or more functions, including but not limited to the functions discussed above, such that the pair of soft actuators 14 grasp an object 'O'. In some variations, a holding force of the soft actuator system 20, i.e., of the soft actuators 14, is adjustable as a function of an internal pressure within one or more of the soft actuators 14. And while FIG. 7 illustrates the pair of soft actuators 14 having moved in a single direction (i.e., the + and—x directions) after inflation to grasp the object O, it should be understood from the teachings of the present disclosure that one or both of the soft actuators 14 can be moved in more than one direction after inflation. That is, one or both of the soft actuators 14 can have three degrees of movement. And while the soft actuator system 20 is shown grasping the object O, it should be understood that the soft actuator system 20, and other soft actuators disclosed herein, can be configured to, and used for dropping, pushing, pulling, or translating one or more objects.

The preceding description is merely illustrative in nature and is in no way intended to limit the disclosure, its application, or its uses. Work of the presently named inventors, to the extent it may be described in the background section, as well as aspects of the description that may not otherwise qualify as prior art at the time of filing, are neither expressly nor impliedly admitted as prior art against the present technology.

The block diagram in the figures illustrates the architecture, functionality, and operation of possible implementations of systems, methods, and computer program products according to various embodiments. In this regard, each block in the block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, devices, processes, and/or controllers described above can be realized in hardware or a combination of hardware and software and can be realized in a centralized fashion in one processing system or in a distributed fashion where different elements are spread across several interconnected processing systems. Any kind of processing system or another apparatus adapted for conducting the methods described herein is suited. A typical combination of hardware and software can be a processing system with computer-usable program code that, when being loaded and executed, controls the processing system such that it conducts the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to conduct these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be conducted in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A soft actuator, comprising:
   an origami structure comprising a woven fabric forming a hollow body with a plurality of protruding vertices between a plurality of folds, wherein inflation of the hollow body creates an inflated origami structure; and
   a twisted coiled polymer actuator (TCPA) attached directly to the woven fabric and disposed on one or more of the plurality of protruding vertices of the origami structure such that actuation of the TCPA manipulates the inflated origami structure.

2. The soft actuator of claim 1, wherein the woven fabric comprises at least one of Dyneema fabric or Kevlar fabric.

3. The soft actuator of claim 1, wherein a holding force of the hollow body is adjustable as a function of an internal pressure within the hollow body.

4. The soft actuator of claim 1, wherein the TCPA is actuated via a change in temperature.

5. The soft actuator of claim 1, wherein the TCPA is actuated via Joule heating.

6. The soft actuator of claim 1 further comprising a heating wire configured to heat the TCPA.

7. The soft actuator of claim 1 further comprising a coating configured to heat the TCPA.

8. The soft actuator of claim 1, wherein the TCPA is formed from one of nylon, spandex, polyester, polyethylene, and polyethylene terephthalate.

9. The soft actuator of claim 1, wherein the TCPA is a plurality of TCPAs disposed on two or more of the plurality of protruding vertices of the origami structure.

10. The soft actuator of claim 9 further comprising a controller configured to selectively actuate the plurality of TCPAs.

11. The soft actuator of claim 10, wherein the actuation of at least one of the plurality of TCPAs occurs prior to the inflation of the hollow body.

12. The soft actuator of claim 10, wherein the inflation of the hollow body occurs prior to the actuation of at least one of the plurality of TCPAs.

13. The soft actuator of claim 10, wherein the inflation of the hollow body and the actuation of at least one of the plurality of TCPAs occur simultaneously.

14. A soft actuator, comprising:
   an origami structure comprising a hollow body with a plurality of protruding vertices between a plurality of folds, the hollow body being formed from a woven fabric selected from Dyneema fabric or Kevlar fabric; and
   a twisted coiled polymer actuator (TCPA) attached directly to the woven fabric and disposed on one or more of the protruding vertices between the plurality of folds of the origami structure, wherein inflation of the hollow body creates an inflated origami structure and actuation of the TCPA via a change in temperature manipulates inflation of the origami structure.

15. The soft actuator of claim 14, wherein the TCPA is formed from at least one of nylon, spandex, polyester, polyethylene, and polyethylene terephthalate.

16. The soft actuator of claim 14 further comprising a plurality of TCPAs and a controller configured to selectively actuate the plurality of TCPAs.

17. A soft actuator, comprising:
an origami structure comprising a woven fabric forming an inflatable hollow body with a plurality of protruding vertices between a plurality of folds, the inflatable hollow body being formed from at least one of Dyneema fabric or Kevlar fabric;
a plurality of twisted coiled polymer actuators (TCPAs) formed from at least one of polyethylene terephthalate, spandex, and nylon, the plurality of TCPAs attached directly to the woven fabric and at least one of the plurality of TCPAs being disposed on one or more of the plurality of protruding vertices of the origami structure;
a plurality of heating wires disposed on the plurality of TCPAs; and
a controller configured to selectively heat the plurality of heating wires such that the plurality of TCPAs are selectively actuated by being heated by the plurality of heating wires.

18. The soft actuator of claim 17 further comprising a coating configured to heat the plurality of TCPAs.

19. The soft actuator of claim 17, wherein a holding force of the inflatable hollow body is adjustable as a function of an internal pressure within the inflatable hollow body.

20. The soft actuator of claim 17, wherein inflation of the inflatable hollow body and actuation of at least one of the plurality of TCPAs occur simultaneously.

* * * * *